United States Patent
Clifford

[11] Patent Number: 5,953,973
[45] Date of Patent: Sep. 21, 1999

[54] EXHAUST-DRIVEN SAWDUST VENTING ATTACHMENT FOR A SAWMILL

[76] Inventor: Allen E. Clifford, P.O. Box 1518, Trout Creek, Mont. 98594

[21] Appl. No.: 08/964,009

[22] Filed: Nov. 4, 1997

[51] Int. Cl.⁶ ........................................................ B26D 7/00
[52] U.S. Cl. ........................................ 83/98; 83/99; 83/478
[58] Field of Search ............................. 83/98, 99, 100, 83/478, 544, 545, 546; 144/252.2, 252.1; 409/137; 408/67

[56] References Cited

U.S. PATENT DOCUMENTS

| | | | |
|---|---|---|---|
| 922,840 | 5/1909 | Bemiller | 83/100 |
| 1,708,345 | 4/1929 | Wodack et al. | 30/377 |
| 1,833,785 | 11/1931 | Krieger | 83/98 |
| 2,236,232 | 3/1941 | Brescka et al. | 83/98 |
| 2,339,324 | 1/1944 | Fischer | 144/252.1 |
| 2,351,740 | 6/1944 | Blum | 30/383 |
| 3,135,151 | 6/1964 | Link et al. | 83/100 |
| 3,274,892 | 9/1966 | Carsey | 408/67 |
| 3,971,294 | 7/1976 | Devrick et al. | 90/20 |
| 4,201,256 | 5/1980 | Truhan | 144/252 |
| 4,361,957 | 12/1982 | Krotz et al. | 83/100 |
| 4,367,665 | 1/1983 | Terpstra et al. | 83/100 |

FOREIGN PATENT DOCUMENTS

| | | | |
|---|---|---|---|
| 133993 | 10/1980 | Italy | 83/100 |
| 1159778 | 6/1985 | U.S.S.R. | 83/98 |

*Primary Examiner*—M. Rachuba
*Assistant Examiner*—Stephen Choi
*Attorney, Agent, or Firm*—David S. Thompson

[57] ABSTRACT

An exhaust-driven sawdust venting attachment for a sawmill provides a curved conduit portion attachable to the protective blade cover of the sawmill. A first exhaust inlet, carried by the curved conduit portion, supplies a stream of exhaust gasses that transports sawdust into a straight conduit portion. A second exhaust inlet carried by the straight conduit portion supplies a stream of exhaust gasses that transports sawdust out a vent opening some distance from the sawmill. As a result, sawdust does not tend to accumulate in the area of the saw blade.

1 Claim, 2 Drawing Sheets

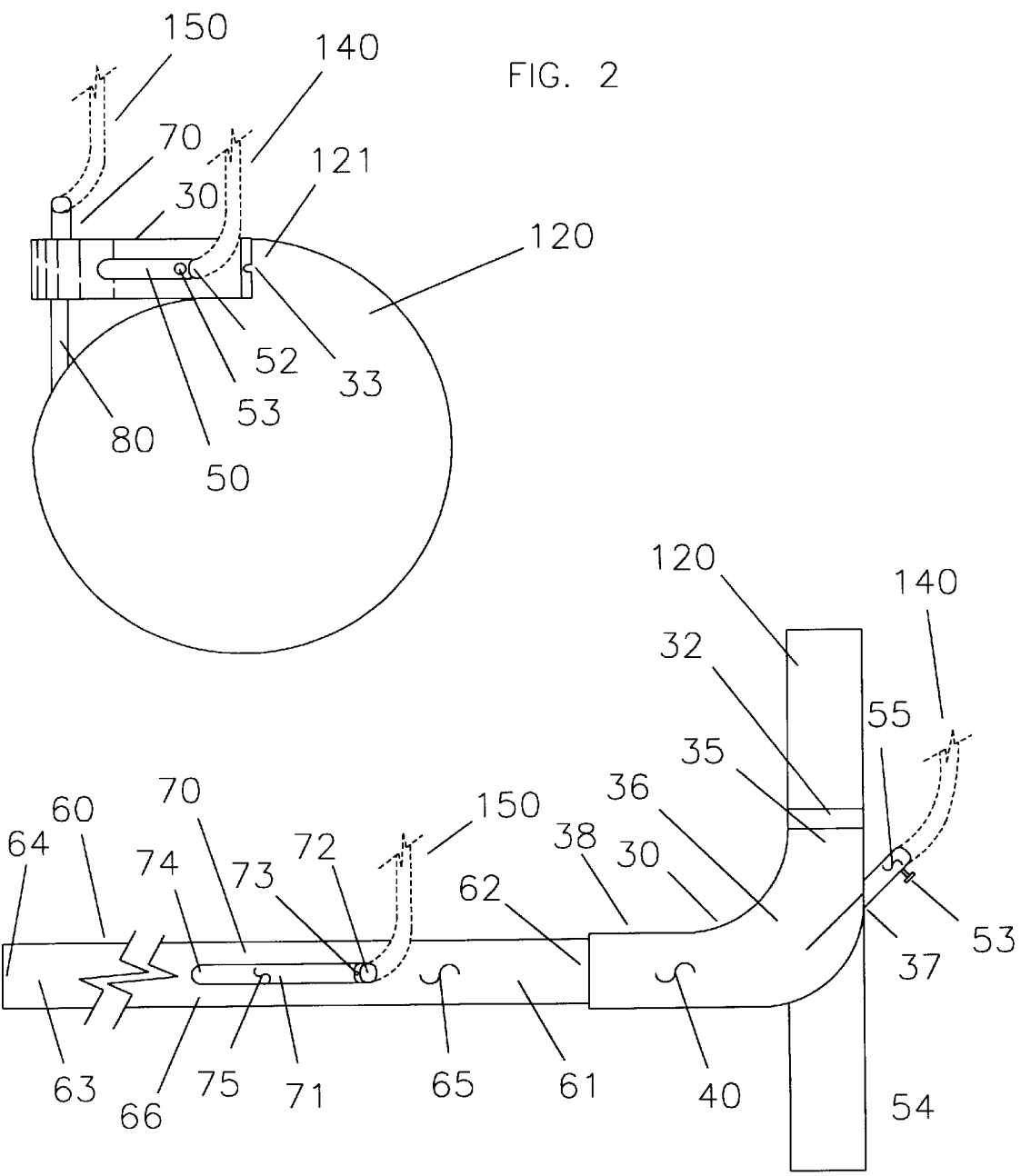

EXHAUST-DRIVEN SAWDUST VENTING ATTACHMENT FOR A SAWMILL

CROSS-REFERENCES

There are no applications related to this application filed in this or any foreign country.

BACKGROUND

The accumulation of sawdust in the area around the blade of a sawmill is a well-known problem. In some circumstances it is necessary to stop the blade and manually clean the area with a broom or other tool. This task is frequently made more difficult, since over time a considerable amount of sawdust may accumulate, making it impossible to simply sweep it away without shoveling excess sawdust to a more distant location.

What is needed is an attachment for a sawmill that is adapted to remove sawdust from the general area of the sawmill, thereby clearing the area of the blade, and additionally transporting the sawdust to a place where it may be allowed to accumulate without detriment. The attachment should be engine exhaust-driven, to thereby use power that is already available, and to require the minimum amount of additional machinery and hardware.

SUMMARY

The present invention is directed to an apparatus that satisfies the above needs. A novel exhaust-driven sawdust venting attachment for a sawmill is provided that transfers sawdust from the enclosure surrounding the blade for disposal some distance from the blade.

The exhaust-driven sawdust venting attachment for connection to the protective blade cover of a sawmill, and for connection to first and second exhaust pipes of an engine driving a saw blade of the sawmill, provides some or all of the following structures.

(A) A curved conduit portion, having first and second ends, the conduit portion defining an arc of approximately 90 degrees. The first end of the curved conduit portion defines an input opening carrying a fastener for attachment to the protective blade cover.

(B) A first exhaust inlet, carried by the curved conduit portion and positioned tangentially to an axial portion of a middle location of the curved conduit portion. The first exhaust inlet connected to a first exhaust pipe by a first hose adapted for transfer of exhaust gasses.

(C) A straight conduit portion, having a first end attached to the second end of the curved conduit portion, receives exhaust and sawdust from the curved conduit portion. The straight conduit portion has a second end defining a vent opening, which allows sawdust and exhaust fumes to be expelled some distance from the sawmill.

(D) A second exhaust inlet, carried by a middle location of the straight conduit portion, is aligned so that exhaust gasses carried by the second exhaust inlet are directed substantially toward the vent opening. The second exhaust inlet is connected to the second exhaust pipe by hose adapted for transfer of exhaust gasses.

(F) A support bracket, attached to the straight conduit portion, is adapted to support of the sawdust venting attachment from the sawmill. The support bracket carries one or more fasteners for attachment to the sawmill.

It is therefore a primary advantage of the present invention to provide a novel exhaust-driven sawdust venting attachment for a sawmill that utilizes exhaust gasses already available at the sawmill site as a source of power to remove unwanted sawdust.

Another advantage of the present invention is to provide a novel exhaust-driven sawdust venting attachment for a sawmill that is easily adapted to new and existing sawmills.

A still further advantage of the present invention is to provide a novel exhaust-driven sawdust venting attachment for a sawmill that provides a two-stage construction, whereby a first exhaust hose is attached to the venting attachment adjacent to the connection to the blade's protective cover, and a second exhaust hose is attached to the venting attachment in a medial location within the venting attachment, thereby preventing accumulation of sawdust within the venting attachment.

DRAWINGS

These and other features, aspects, and advantages of the present invention will become better understood with regard to the following description, appended claims, and accompanying drawings where:

FIG. 1 is a plan view of a version of the exhaust-driven sawdust venting attachment, showing the protective blade cover and exhaust hoses to which it is attached;

FIG. 2 is a end isometric view of the attachment of FIG. 1, also showing the protective blade cover;

DESCRIPTION

Figure 3:
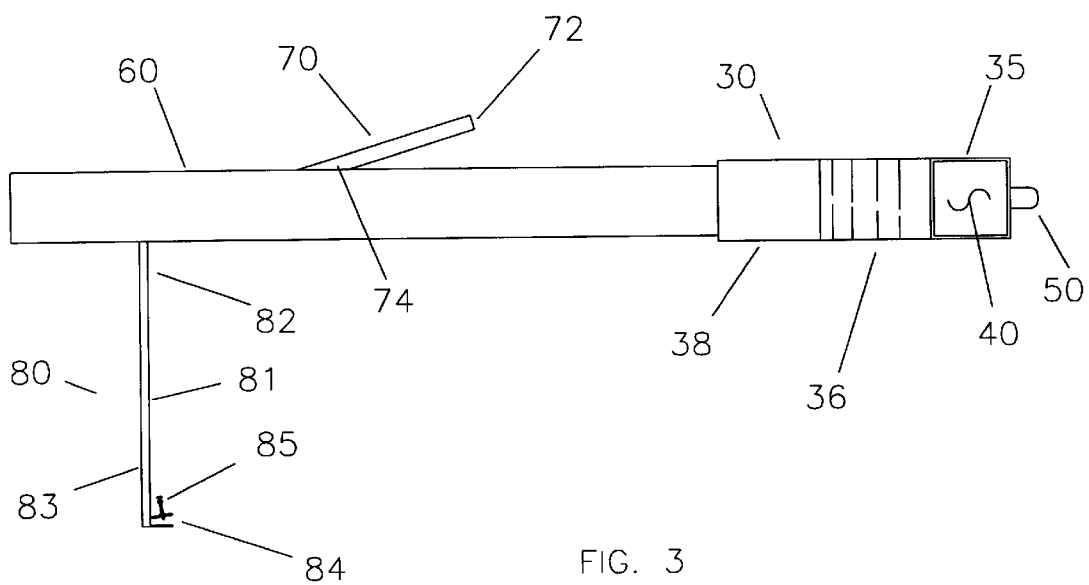
FIG. 3 is a side isometric view of the attachment of FIG. 1 removed from the protective blade cover.
Figure 4:
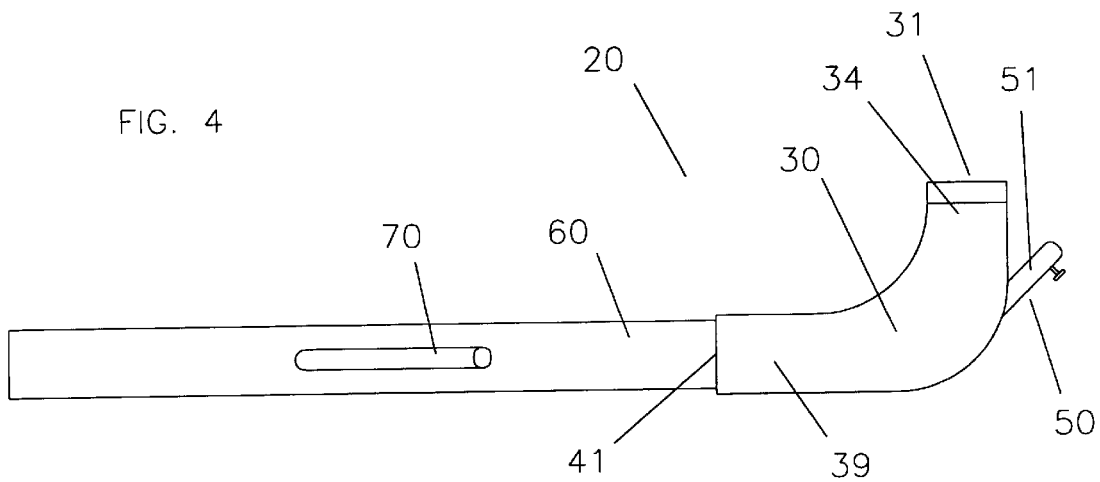
FIG. 4 is a view similar to that of FIG. 1, having the protective blade cover removed for clarity.

Referring generally to FIGS. 1–4, an internal-combustion exhaust-driven sawdust venting attachment 20 for a sawmill constructed in accordance with the principles of the invention is seen. The venting attachment provides a curved conduit portion 30 attachable to the protective blade cover 120 of the sawmill. A first exhaust inlet 50, carried by the curved conduit portion, supplies a stream of exhaust gasses that transports sawdust into a straight conduit portion 60. A second exhaust inlet 70 carried by the straight conduit portion supplies a stream of exhaust gasses that transports sawdust out a vent opening 64 some distance from the sawmill. As a result, sawdust does not tend to accumulate in the area of the saw blade.

A curved conduit portion 30 is seen in all figures. The curved conduit portion has a first end 34 defining an input opening 31 and a second end 39 defining an output opening 41. A collar 32 is sized to fit over the opening in the protective blade cover 120 of a sawmill. The collar carries a fastener 33 for attachment to the protective blade cover. In the preferred embodiment, the fastener includes notches adapted for attachment to the blade cover by bolts, but any suitable fastener could be used. The curved conduit portion 30 includes a straight inner portion 35, a curved middle portion 36 and a straight outer portion 38, and defines an interior channel 40 extending the length of the conduit 30.

A first exhaust inlet 50 provides a tubular body 51 and a fastener 53. The tubular body is attached to the curved conduit portion at an exhaust inlet attachment location 37 that is typically adjacent to both the straight inner portion 35 and the curved middle portion 36. The exhaust inlet attachment location 37 should be selected to so that sawdust propelled by the saw blade is not allowed to come to a stop in the curved middle portion 36. The tubular body is hollow, having an axial channel 55 with an input opening 52 and an output opening 54.

The fastener 53 secures a first exhaust hose 140 transferring exhaust from a first exhaust pipe (not shown) associated with the engine (not shown) powering the sawmill. The fastener is typically threaded, but may be of any known type suitable for securing the first exhaust hose to the input opening 52 of the first exhaust inlet 50.

A straight conduit portion 60 is seen in all figures. The straight conduit portion has a first end 61 defining an input opening 62 and a second end 63 defining an vent opening 64. The input opening 62 communicates with the output opening 41 of the curved conduit 30, allowing exhaust gasses to flow through an interior channel 65 through the vent opening 64.

A second exhaust inlet 70 is similar to the first exhaust inlet 50, and provides a tubular body 71 and a fastener 73. An output opening 74 of the tubular body is attached to the straight conduit portion 60 at a middle location 66. The location of attachment should be selected close enough to the first end 61 so that sawdust traveling through the interior channel 65 does not stop moving inside the interior channel 65, and should be close enough to the second end 63 so that sawdust is easily exhausted from the vent opening 64. The tubular body 71 is hollow, having an axial channel 75 with an input opening 72 and an output opening 74.

A portion of the tubular body adjacent to the input opening 72 may carry a fastener 73, which secures a second exhaust hose 150 transferring exhaust from a second exhaust pipe (not shown) associated with the engine (not shown) powering the sawmill. Alternatively, the hose 150 may be friction-fit onto the input opening 72. The fastener is typically threaded, but may be of any known type suitable for securing the second exhaust hose to the input opening 72 of the second exhaust inlet 70.

A support bracket 80 supports the straight conduit 60 in an area near the vent opening 64. In a preferred embodiment of the invention, the support bracket provides a tubular body 81 having an upper end 82 attached to the straight conduit portion 60 and a lower end 83 carrying a fastener for connection to the sawmill or other location. In a preferred embodiment, the fastener used by the support bracket is fastened to an upper portion of the sawmill, and includes a supporting fork 84 and fastening screw 85.

To use the exhaust-driven sawdust venting attachment for a sawmill, the input opening 31 of the curved conduit portion 30 is attached to the exhaust opening 121 in the blade cover 120 of the sawmill by the fastener 33. The first end 61 of the straight conduit portion 60 is then attached to the second end 39 of the curved conduit portion. The support bracket 80 is then attached to the sawmill or other convenient location, thereby providing support for the attachment 20. The first and second exhaust inlets 50, 70 are then attached to the first and second exhaust hoses 140, 150.

During the operation of the sawmill, sawdust is forced out of the opening 121 in the protective blade cover 120, and enters the curved conduit portion 30. Exhaust expelled from the first exhaust inlet 50 propels the sawdust around the curved middle portion 36, and into the straight conduit portion 60. Exhaust expelled from the second exhaust inlet 70 then propels the sawdust through the interior channel 65 and out the vent opening 64. The sawdust then accumulates some distance from the sawmill, in an area that can be set aside for this purpose.

The previously described versions of the present invention have many advantages, including a primary advantage of providing a novel exhaust-driven sawdust venting attachment for a sawmill that utilizes exhaust gasses already available at the sawmill site as a source of power to remove unwanted sawdust.

Another advantage of the present invention is to provide a novel exhaust-driven sawdust venting attachment for a sawmill that is easily adapted to new and existing sawmills.

A still further advantage of the present invention is to provide a novel exhaust-driven sawdust venting attachment for a sawmill that provides a two-stage construction, whereby a first exhaust hose is attached to the venting attachment adjacent to the connection to the blade's protective cover, and a second exhaust hose is attached to the venting attachment in a medial location within the venting attachment, thereby preventing accumulation of sawdust within the venting attachment.

The invention resides not in any one of these features per se, but rather in the particular combination of all of them herein disclosed and claimed and it is distinguished from the prior art in this particular combination of all of its structures for the functions specified.

Although the present invention has been described in considerable detail and with reference to certain preferred versions, other versions are possible. For example, while the preferred embodiment provides two exhaust inlets, one each carried by the curved and straight conduit portions, it is possible that a greater or lesser number of exhaust inlets could be used. Similarly, while the preferred embodiment of the invention includes distinct curved and straight conduit portions, it is clear that these elements could be combined if desired. And further, while in most applications use of both a curved conduit and a straight conduit is advisable, in some applications either alone may be sufficient. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An exhaust-driven sawdust venting attachment for connection to a protective blade cover of a sawmill and for connection to first and second exhaust pipes of an engine driving a saw blade of the sawmill, the exhaust-driven sawdust venting attachment comprising:

(A) a curved conduit portion, having first and second ends, the conduit portion defining an arc of approximately 90 degrees;

(B) the first end of the curved conduit portion defining an input opening carrying fastening means for attachment of the curved conduit portion to the protective blade cover;

(C) a first exhaust inlet, in communication with the curved conduit portion and oriented tangentially to an interior channel of a curved middle portion of the curved conduit portion, whereby exhaust is discharged from the exhaust inlet into the curved conduit portion, the first exhaust inlet connected to the first exhaust pipe by a first hose adapted for transfer of exhaust gasses;

(D) a straight conduit portion, having a first end attached to the second end of the curved conduit portion, thereby allowing transfer of exhaust and sawdust from the curved conduit portion into the straight conduit portion, the straight conduit portion also having a second end defining a vent opening;

(E) a second exhaust inlet, in communication with a middle location of the straight conduit portion, the second exhaust inlet oriented so that exhaust gasses discharged by the second exhaust inlet are directed substantially toward the vent opening, the second exhaust inlet connected to the second exhaust pipe by a hose adapted for transfer of exhaust gasses; and (F) a support bracket, attached to the straight conduit portion, adapted for support of the sawdust venting attachment, the support bracket carrying fastening means for attachment to the sawmill.

* * * * *